United States Patent Office 3,490,929
Patented Jan. 20, 1970

3,490,929
PROCESS FOR PREPARING REFRACTORY METAL
OXIDE CASTS
Gilbert S. Layne and James O. Huml, Midland, Mich.,
assignors to The Dow Chemical Company, Midland,
Mich., a corporation of Delaware
No Drawing. Filed Nov. 14, 1966, Ser. No. 593,655
Int. Cl. C04b 35/70, 35/62
U.S. Cl. 106—55                                    18 Claims

ABSTRACT OF THE DISCLOSURE

A process is provided for preparing refractory metal oxide casts, which can be solid or porous. A fused composition comprising at least about 10 percent refractory metal sulfide and up to about 90 percent of a refractory metal oxide is provided in a mold and solidified. The resultant solidified shape is treated with an appropriate gaseous compound to remove the sulfide from the cast and/or convert at least a portion of it to a refractory metal oxide. The cast is maintained at a sufficient elevated temperature during the gaseous treatment to prevent destruction of the integrity of the cast.

---

The present invention relates to refractory metal oxide casts and in particular to a process for preparing refractory metal oxide casts.

Several methods of preparing refractory metal oxide casts are well known in the art. One such process comprises fusing a refractory metal oxide or a mixture of refractory metal oxides and pouring the resulting molten composition into a mold. A second process involves prepacking molds with a powdered metal oxide or a water slurry of the metal oxide and fusing the metal oxide in situ. There are several inherent disadvantages associated with each of these methods. First, the most favorable refractory metal oxides have extremely high melting points, therefore, equipment capable of producing such elevated temperatures must be employed. Also, difficulty in handling occurs at such elevated temperatures and special mold material likewise is required. The prepacking process also has other inherent disadvantages. Because metal oxides become more dense upon fusion, air spaces tend to be formed in prepacked molds upon solidification of the metal oxide. The water slurry method does not alleviate the formation of the undesirable air spaces. Pouring the molten composition into molds tends to alleviate the undesirable air pockets formed when a mold is prepacked. Thus, it readily is apparent that pouring molten refractory metal oxides at substantially lower fusion temperatures is a preferable method of forming such casts. Lower temperatures also allow greater flexibility in handling and result in the production of finer quality refractory metal oxide casts. In accordance with the present invention, pouring techniques for casting can be utilized and disadvantages caused by extreme heat requirements as required in processes employed heretofore are alleviated.

It is a principal object of the present invention to provide a novel and useful process for preparing refractory metal oxide casts.

It is another object of the present invention to provide a novel process for preparing refractory metal oxide casts at considerably lower fusion temperatures than has heretofore been possible.

It is a further object of the present invention to provide a pouring technique employing relatively low fusion temperatures and associated with said lower temperature an initial fused refractory composition having a lower viscosity than heretofore has been possible.

It is still another object of the present invention to provide a novel process for preparing refractory metal oxide casts of uniform consistancy and having controlled porosity throughout the individual casts.

These and other objects and advantages will readily become apparent from the detailed description presented hereinafter.

The present invention comprises providing in a mold a fused composition comprising at least one refractory metal sulfide; solidifying the resultant molten mixture in the mold; contacting the solidified shape with a metal sulfide decomposing agent to remove sulfur values comprising sulfur and/or sulfur containing compounds from the solidified mixture and produce the corresponding refractory metal oxide thereby forming a cast containing as the major constituent the refractory metal oxide.

The term "refractory metal" as used herein designates the Group I-A, II-A, III-B, and IV-B elements of the Periodic Table, aluminum, chromium, silicon, vanadium, iron, cobalt, nickel and the elements of the Lanthanide and Actinide series of the Periodic Table.

The terms "casting" or "cast" as used herein designates solidified refractory metal oxide or metal oxides after substantially all sulfur and/or sulfur-containing compounds have been removed.

More particularly in accordance with the method of the present invention, usually a metal oxide-metal sulfide mixture of at least one refractory metal oxide and at least one refractory metal sulfide is fused. The actual fusion temperature employed varies accordingly with the proportion and constituents of said mixture. To achieve any beneficial lowering of the fusion temperature, however, the refractory metal oxide-metal sulfide mixture, at a minimum, must contain at least 10 percent by weight of a refractory metal sulfide. It is recognized that some of the indicated refractory metal sulfides and mixtures thereof have melting points which are below or near to the melting points of the corresponding metal oxide-metal sulfide compositions. In these instances, therefore, the initial molten composition may consist of such refractory metal sulfides.

After the refractory metal oxide-metal sulfide mixture is fused, it is cooled sufficiently in a mold to solidify the mixture. The metal oxide-metal sulfide shape is maintained at a predetermined temperature and treated with a metal sulfide decomposition agent, ordinarily an oxygen-containing oxidation gas. When treated with an oxygen-containing oxidation gas, the metal sulfides are converted to corresponding metal oxides, and sulfur is expelled from the casting as volatile sulfur containing compounds, predominately as $SO_2$. The oxygen containing oxidation gas must be inert to the metal oxides present in the shape, and preferred oxygen containing oxidation gases consist of carbon dioxide ($CO_2$), oxygen ($O_2$), air and water (vapor). These listed agents are preferred since they are substantially inert to the refractory metal oxides present and are also economical to use.

The solidified mixture should be maintained at a sufficient temperature during the treatment with the oxidizing gas to assure a ready and complete conversion of the metal sulfide to the metal oxide. However, careful control of the temperature must be maintained during the oxidation treatment to prevent destroying the integrity of the solidified metal oxide-metal sulfide mixture. The actual temperature to be used with a given system will be determined in accordance with the composition of the refractory metal sulfide or metal oxide-metal sulfide mixtures employed.

The flow of the oxidizing gas is continued for a sufficient time to substantially convert the metal sulfide to the corresponding metal oxide. The treatment time will vary in accordance with the composition, size, and weight of the refractory metal oxide-metal sulfide mixture, and with the flow rate of said gas. A simple method of testing the effluent gases from the mold to determine the presence of sulfur and sulfur-containing compounds can be used to monitor the required oxidation time. When the effluent gases are substantially free of sulfur compounds, the oxidation of the metal sulfide is substantially complete. It is preferred that the resultant cast should contain at a maximum about 1 percent by weight of sulfur-containing compounds. For instance, when aluminum sulfide is one of the constituents of the mixture it is very important to limit the aluminum sulfide content of the resultant cast to less than 1 percent by weight, because aluminum sulfide has moisture absorption properties which are undesirable in refractory metal oxide casts.

After the flow of said oxygen-containing gas is continued for a sufficient time to assure substantially complete conversion of the metal sulfide to the metal oxide the resulting volatile sulfur-containing compounds are separated from the cast, e.g. by being carried along in the effluent gas stream. If desired, the cast can then be sintered to further densify the resultant refractory metal oxide cast.

As a specific embodiment of the heretofore described invention, with certain metal oxide-metal sulfide reaction mixtures the metal cation of the metal sulfide as well as the sulfur can be removed from the metal oxide-metal sulfide mixture to provide a porous refractory metal oxide structure which is useful, for example, as insulation brick. The specific embodiment provides an alternative to the oxidation step of the process described previously. Instead of oxidizing the metal sulfide to the corresponding metal oxide, a solidified metal oxide-metal sulfide shape is treated with a halogen or hydrogen halide, wherein the metal sulfide is converted to a volatile metal halide.

The process steps, including the preparation of the mixture, providing the molten mixture in a mold, and cooling said mixture to solidify the same are carried out exactly as heretofore described thus achieving all the advantages associated with lower viscosity and fusion temperatures.

In particular this specific embodiment of the invention consists of treating a solidified refractory metal oxide-metal sulfide mixture, prepared in the manner as heretofore described, with a decomposition agent other than an oxygen containing oxidation gas, at a sufficient temperature and for a sufficient period of time to assure a ready and complete conversion of the metal sulfide. Preferred decomposition agents which can be employed in the present embodiment consist of HCl (g), HF (g), HI (g), HBr (g), $Cl_2$ (g), $Br_2$ (g), $F_2$ (g), $I_2$ (g) and mixtures thereof.

When the halogen or hydrogen halide, in a gaseous state, is employed as the decomposing agent a flow of said gas is contacted with the previously fused and solidified refractory metal oxide-metal sulfide mixture for a sufficient period of time while the mixturet is maintained at a sufficient temperature to assure a complete decomposition of the metal sulfide. The metal cation of the metal sulfide compound is removed as a volatile metal halide and the sulfur as a volatile sulfur compound predominately $H_2S$. The resultant porous metal oxide cast is then separated from the volatile sulfur and halogen compounds. Sulfides of the following refractory metals are preferred when a halogen or hydrogen halide is employed as the decomposing agent. They are: $Al_2S_3$, FeS, $TiS_2$, $ZrS_2$, $ThS_2$ and $US_2$.

Since some of the refractory metal oxides employed in the method of the present invention will also react with the halogen or hydrogen halide decomposition agents employed herein, the metal oxide of the final cast must be chosen from those which will not react with the decomposition agents at the conditions employed herein.

Also in the actual operation of this specific embodiment of the present invention the metal sulfide must be selected from those materials wherein the cation forms a metal halide having a volatilization temperature below the volatilization or melting point temperature of the corresponding metal oxide or oxides in the mixture. This assures that the metal oxide does not melt as the metal halide is removed and the integrity of the pre-formed shape is maintained.

In the specific embodiment the initial metal sulfide content of the refractory metal oxide-metal sulfide mixture should be at least 10 percent by weight, as previously state, to produce a beneficial decrease in the fusion temperature. However, when a halogen or hydrogen halide gas is utilized as the decomposition agent the maximum metal sulfide content, preceding the decomposing step, should be no greater than 20 percent by weight of the mixture. This maximum 20 percent metal sulfide content assures a final cast having adequate structural strength. The metal sulfide content can be limited to 20 percent, for example, by either limiting the initial metal sulfide content of the mixture or by carrying out the oxidation step as heretofore described for a sufficient period of time to convert a sufficient quantity of the metal sulfide to the metal oxide. The latter method of limiting the metal sulfide content would be preferred in systems where the lowest initial fusion temperature is achieved by a mixture which consists of more than 20 percent by weight of the refractory metal sulfide.

By removing both the metal cation of the metal sulfide compound and sulfur as heretofore described, a porous refractory metal oxide cast is produced which is useful, for example, as insulation brick.

While preparing refractory metal oxide casts by the new process as heretofore described the following comparison of melting points have been observed: A mixture consisting of cobalt oxide and from 25–50 percent by weight of ferrous sulfide fused at less than 1000° C. A corresponding ferric oxide-cobalt oxide mixture fuses into a spinel with a melting point markedly higher than 1000° C. A system containing 100 percent by weight of cobalt oxide has a melting point of approximately 1800° C. In comparison, a system containing approximately 70 percent by weight of cobalt sulfide in admixture with cobalt oxide will fuse at 910° C. A particularly useful refractory metal oxide mixture consists of aluminum oxide and titanium oxide. Such a mixture has a melting point of approximately 1860° C. However, a mixture comprising titanium oxide and approximately 65 percent by weight of aluminum sulfide fuses at approximately 1650° C. These are merely illustrative of differentials in fusion temperatures yhich can be obtained by preparing a refractory metal oxide-metal sulfide mixture as a starting material in the embodiment of the present process. These examples are intended for illustrative purposes only and are not meant to limit the scope of the present invention.

In the actual operation of the present process the initial refractory metal oxide-metal sulfide or refractory metal sulfide composition can be fused separate from the mold and then poured into a mold or the mold can be prepacked with powdered material and then fused in situ. The pouring technique is preferred since the method of prepacking the molds has many inherent disadvantages such as inconsistency in the resultant cast. The molds can be formed of any material having a structural stability sufficient to withstand the elevated temperatures employed, and suitable mold materials consist of graphite and refractory metal oxides.

In the present invention the refractory metal oxide-metal sulfide mixture can consist of the same metal cation or two or more metal cations may be employed; additionally with metal sulfide mixtures, two or more different metal cations can be used. The method of the present invention is especially suited for preparing refractory metal oxide casts wherein the metal cation comprises Zr, Al, Ti, Th, Mg, Ca, Cr, and Be and also mixed metal oxide casts comprising Al and Si, Mg and Cr, Mg and Zr, Al and Ti, and a few especially useful metal oxide mixtures such as beta aluminum oxide, ($Na_2O \cdot 11Al_2O_3$) used in battery cells and certain ceramic ferrite compounds consisting of iron and oxygen atoms along with barium, manganese, zinc or other divalent ions which are now finding special utility as materials in the manufacture of permanent magnets.

The preparation of refractory metal oxide casts by the novel process herein described in detail can be carried out in a batch or a continuous type operation.

The following examples will further serve to illustrate the present invention but are not meant to limit it thereto.

EXAMPLE 1

A graphite mold was packed with a mixture of 40 grams titanium oxide and 75 grams aluminum sulfide. A melt was formed by heating the mixture in the mold to 1650° C. The mold containing the mixture was cooled sufficiently to solidify the mixture and maintained at a temperature of about 1000° C. A flow of air was passed through the mold and in contact with the solidified mixture for a period of time while the temperature was maintained at 1000° C. This converted the aluminum and titanium sulfide to the corresponding oxide. The shape was then sintered at 1600° C. which produced a dense hard shape of aluminum oxide and titanium oxide mixture.

EXAMPLE 2

A graphite mold was packed with a mixture of 92.5 grams of zirconium oxide and 112.5 grams of aluminum sulfide. A melt was formed by heating the mixture in the mold to 1650° C. The mold containing the mixture was cooled sufficiently to solidify the mixture and maintained at a temperature of 1000° C. A flow of air was passed through the mold and in contact with the solidified mixture while the said temperature was maintained at 1000° C. This burned away the mold and produced a cast of the corresponding refractory metal oxides. The resulting cast was sintered at 1600° C. which produced a dense hard shape of aluminum oxide and zirconium oxide mixture.

EXAMPLE 3

A mixture containing 25 percent by weight of aluminum sulfide and 75 percent by weight of aluminum oxide was prepared. The mixture was fused and maintained at a temperature of about 1300° C. A metal oxide-metal sulfide shape was prepared by lowering a ½-inch diameter grapite rod into the melt and then withdrawing the rod. A uniform layer of the fused mixture approximately ⅛-inch in thickness was deposited on the end of the graphite rod. The metal oxide-metal sulfide shape was then placed in a muffle furnace and heated to 950° C. in air. This burned the graphite from the shape and oxidized the aluminum sulfide to aluminum oxide. The resultant aluminum oxide cast was then placed in a furnace and maintained at 1500° C. This produced a hard, dense aluminum oxide cast.

EXAMPLE 4

A melt consisting of 45 percent by weight of aluminum oxide and 55 percent aluminum sulfide was prepared in a graphite crucible. The molten mixture in the mold was allowed to solidify and then a portion of the solidified mixture was placed in a quartz tube and heated to 850° C. while supplying air at 150 cc. per minute through the tube and in contact with the solidified mixture. The flow of air was continued for 22 hours at the indicated rate while maintaining the temperature. A sample was taken after 22 hours and was analyzed by a neutron activation technique. This analysis showed that the elemental composition was about 48.9 percent oxygen and about 50.3 percent aluminum. X-ray diffraction data indicated that α-aluminum oxide (corundum) was the chief constituent and gamma-aluminum oxide was the minor constituent.

EXAMPLE 5

A 50 percent by weight aluminum oxide-aluminum sulfide mixture was prepared. This mixture was heated to a temperature of 1600° C. and maintained in the molten form. A ½-inch graphite rod was plunged into the liquid mixture and withdrawn therefrom providing an aluminum oxide-aluminum sulfide coating on the rod. Four different rods were coated in this manner. The so-coated rods were cooled to solidify the mixture. These then were placed in a muffle furnace in the presence of a flow of air at predetermined temperatures and kept therein for various predetermined times. The first sample was treated 22 hours with a flow of air at 800° C. X-ray diffraction data indicated that α-aluminum oxide and α-aluminum sulfide were major constituents, and gamma-aluminum oxide was a minor constituent. The second sample was treated in the presence of air for 67 hours at 800° C. An X-ray diffraction analysis indicated that α-aluminum oxide was the major constituent and only a small amount of aluminum sulfide was present. The third sample was treated in the presence of air for 67 hours at 800° C. followed by 24 hours at 1000° C. X-ray diffraction analysis indicated α-aluminum oxide as the major constituent and gamma aluminum oxide as the minor constituent. No aluminum sulfide was detected. The fourth sample was treated in the presence of air for 94 hours at 800° C. X-ray diffraction analysis indicated α-aluminum oxide as the only observable phase.

EXAMPLE 6

A melt was prepared containing 20 grams of $Al_2S_3$ and 80 grams of $Al_2O_3$ by heating the mixture to 1700° C. The melt was poured into a graphite mold and allowed to cool until solidified and then maintained at approximately 800° C. in a combustion furnace. HCl gas was admitted to the combustion furnace at approximately one liter per minute. The $Al_2S_3$ portion of the cast was converted to gaseous $AlCl_3$ which was removed along with the co-produced $H_2S$ gas from the furnace. After about 45 minutes, the removal of sulfur as $H_2S$ and $AlCl_3$ was complete. The resultant cast was essentially pure $Al_2O_3$ of a slightly porous nature.

In a manner similar to the foregoing examples, other combinations of metal oxides and metal sulfides and refractory sulfide or mixtures of refractory metal sulfides can be prepared and treated with a suitable refractory metal sulfide decomposition agent: in particular an initial fused mixture comprising $Al_2S_3$ and $Na_2O$ can be provided in a mold under the conditions heretofore described. The mixture can be cooled sufficiently to solidify the same and treated with an oxygen-containing gas while maintaining the reaction mass at a sufficient temperature to assure a ready and complete conversion of the aluminum sulfide to aluminum oxide. The resultant volatile sulfur values can be separated thereby providing a cast containing essentially a complex sodium aluminum oxide predominantly beta aluminum oxide. Thus, in accordance with the method of the present invention, refractory metal oxide casts can be formed utilizing substantially lower fusion temperatures than heretofore possible. Because of the lower fusion temperature, greater flexibility can be utilized when preparing the casts.

The method of the present invention can be modified in various ways without departing from the scope or spirit thereof, for it is understood that we limit ourselves only as defined in the claims appended hereto.

We claim:
1. A process which comprises:
  (a) providing in a mold a fused mixture comprising at least one refractory metal sulfide and from zero to about 90 percent of at least one refractory metal oxide;
  (b) solidifying said fused mixture in said mold to provide an integrated cast mixture; and
  (c) converting said refractory metal sulfide to the corresponding refractory metal oxide by contacting said cast with an oxygen containing gas while maintaining said cast at a temperature sufficient to maintain the integrity of the cast to provide a refractory metal oxide cast.

2. The process in accordance with claim 1 where said molten composition is poured into a mold.

3. The process in accordance with claim 1 where the said molten composition comprises a mixture of at least one refractory metal oxide and at least one refractory metal sulfide and said refractory metal oxide and refractory metal sulfide are of the same refractory metal cation.

4. The process in accordance with claim 1 where the molten composition comprises a mixture of at least one refractory metal oxide and at least one refractory metal sulfide and said refractory metal oxide and said refractory metal sulfide are of different refractory metal cations.

5. The process in accordance with claim 1 where said molten composition comprises a mixture of refractory metal sulfides.

6. The process in accordance with claim 1 where the metal oxide and metal sulfide are selected from the refractory metals of the group consisting of Group I-A, II-A, III-B, and IV-B metals, lanthanide and actinide metals, chromium, silicon, vanadium, aluminum, iron, cobalt, nickel and mixtures thereof.

7. The process in accordance with claim 1 where the refractory metal sulfide is $Al_2S_3$ and the refractory metal oxide is a member selected from the group of refractory metals consisting of Group I-A, II-A, III-B and IV-B metals, vanadium, chromium, iron, cobalt, nickel, lanthanide and actinide metals, and mixtures thereof.

8. The process in accordance with claim 1 where the treatment of the solidified composition is continued until substantially all of the sulfur values are removed from the cast.

9. The process in accordance with claim 1 where the resultant refractory metal oxide cast is treated at an elevated temperature to sinter the cast.

10. The process as defined in claim 1 wherein said oxygen containing gas is oxygen, $CO_2$, air, $H_2O$ (vapor) or mixtures thereof.

11. A process for preparing porous refractory metal oxide casts which comprises:
(a) providing in a mold a fused mixture comprising at least one refractory metal oxide and at least one refractory metal sulfide comprising at a maximum about 20 weight percent of said mixture, and further characterized in that the metal cation of the metal sulfide forms volatile metal halides at elevated temperatures;
(b) solidifying said fused mixture in said mold to provide an integrated cast mixture; and
(c) contacting said integrated cast mixture with a refractory metal sulfide decomposition agent selected from the group consisting of gaseous HF, HCl, HBr, HI, $Br_2$, $Cl_2$, $I_2$, $F_2$ or mixtures thereof while maintaining said cast at a sufficient temperature to remove said refractory metal sulfide from said cast as volatile metal halide and sulfur compounds and to maintain the integrity of said cast to provide a porous refractory metal oxide cast.

12. The process in accordance with claim 11 where said molten composition is poured into a mold.

13. The process in accordance with claim 11 where the metal oxide and metal sulfide are selected from the refractory metals of the group consisting of Group I-A, II-A, III-B, and IV-B metals, lanthanide and actinide metals, chromium, silicon, vanadium, aluminum, iron, cobalt, nickel and mixtures thereof.

14. The process in accordance with claim 11 where the refractory metal sulfide is $Al_2S_3$ and the refractory metal oxide is a member selected from the group of refractory metals consisting of Group I-A, II-A, III-B and IV-B metals, vanadium, chromium, silicon, iron, cobalt, nickel, lanthanide and actinide metals and mixtures thereof.

15. A process for preparing porous refractory metal oxide casts which comprises:
(a) providing in a mold a fused mixture comprising at least one refractory metal sulfide and from zero to about 90 percent of at least one refractory metal oxide;
(b) solidifying said fused mixture in said mold to provide an integrated cast mixture;
(c) converting said refractory metal sulfide to the corresponding refractory metal oxide by contacting said cast with an oxygen containing gas while maintaining said cast at a temperature sufficient to maintain the integrity of the cast to provide an integrated cast mixture containing at the maximum about 20 percent of said refractory metal sulfide; and
(d) contacting said integrated cast mixture with a refractory metal sulfide decomposition agent selected from the group consisting of gaseous HF, HCl, HBr, HI, $Br_2$, $Cl_2$, $I_2$, $F_2$ or mixtures thereof while maintaining said cast at a sufficient temperature to remove said refractory metal sulfide from said cast as volatile metal halide and sulfur compounds and to maintain the integrity of said cast to provide a porous refractory metal oxide cast.

16. The process in accordance with claim 15 where said molten composition is poured into a mold.

17. The process as defined in claim 15 wherein said oxygen containing gas is oxygen, $CO_2$, air, $H_2O$ (vapor) or mixtures thereof.

18. The process in accordance with claim 15 where the refractory metal sulfide is $Al_2S_3$ and the refractory metal oxide is a member selected from the group of refractory metals consisting of Group I-A, II-A, III-B and IV-B metals, vanadium, chromium, silicon, iron, cobalt, nickel, lanthanide and actinide metals and mixtures thereof.

References Cited

UNITED STATES PATENTS 3,216,794   11/1965   Roschuk _____ 23—142

JAMES E. POER, Primary Examiner

U.S. Cl. X.R.

106—40, 57, 58, 59, 65, 66, 69